E. A. HAWTHORNE.
LAMP MOUNTING.
APPLICATION FILED MAY 10, 1913.
1,090,982.
Patented Mar. 24, 1914.
2 SHEETS—SHEET 1.
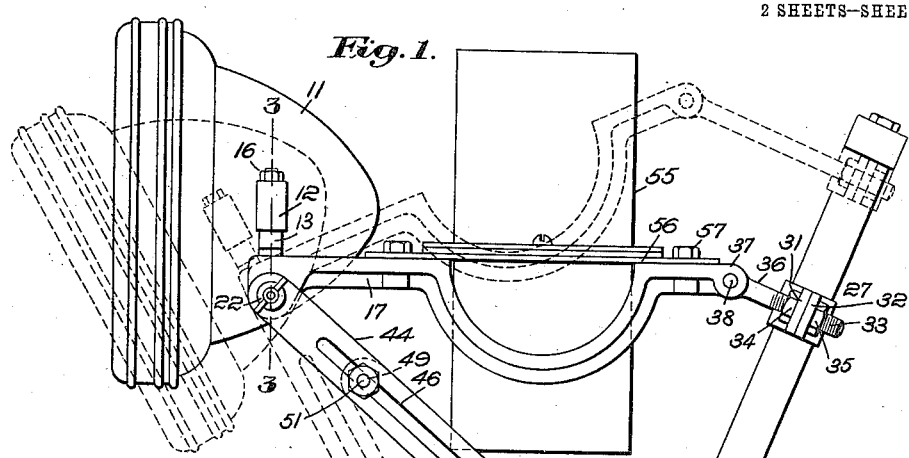
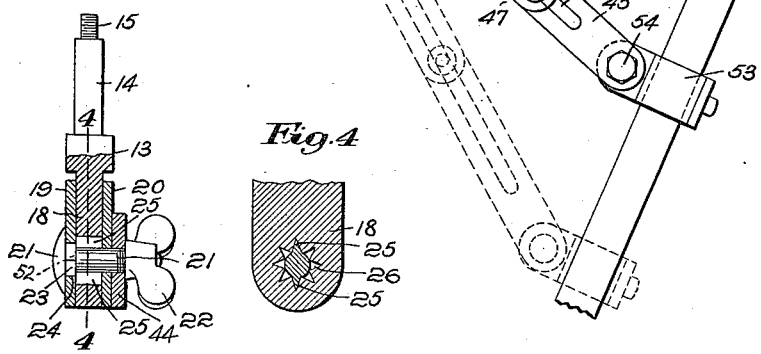
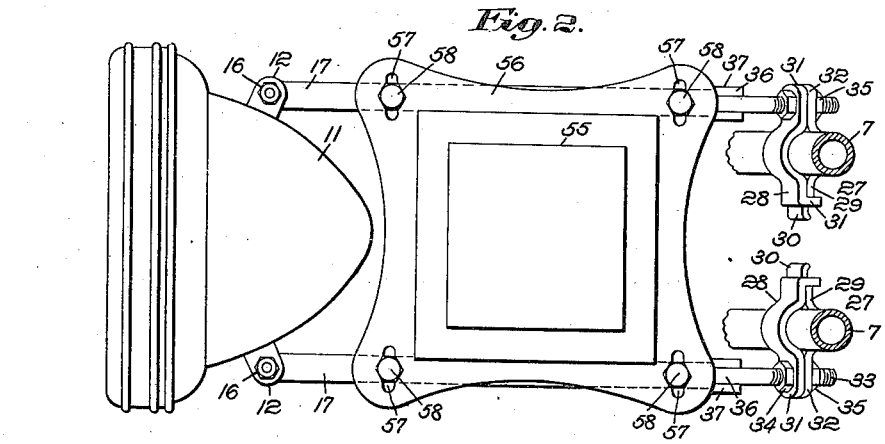
Witnesses:
Carl L. Choate.
Horace A. Crossman.
Inventor:
Ellsworth A. Hawthorne.
by Emery, Booth, Janney & Varney
Attys.

E. A. HAWTHORNE.
LAMP MOUNTING.
APPLICATION FILED MAY 10, 1913.
1,090,982.
Patented Mar. 24, 1914.
2 SHEETS—SHEET 2.
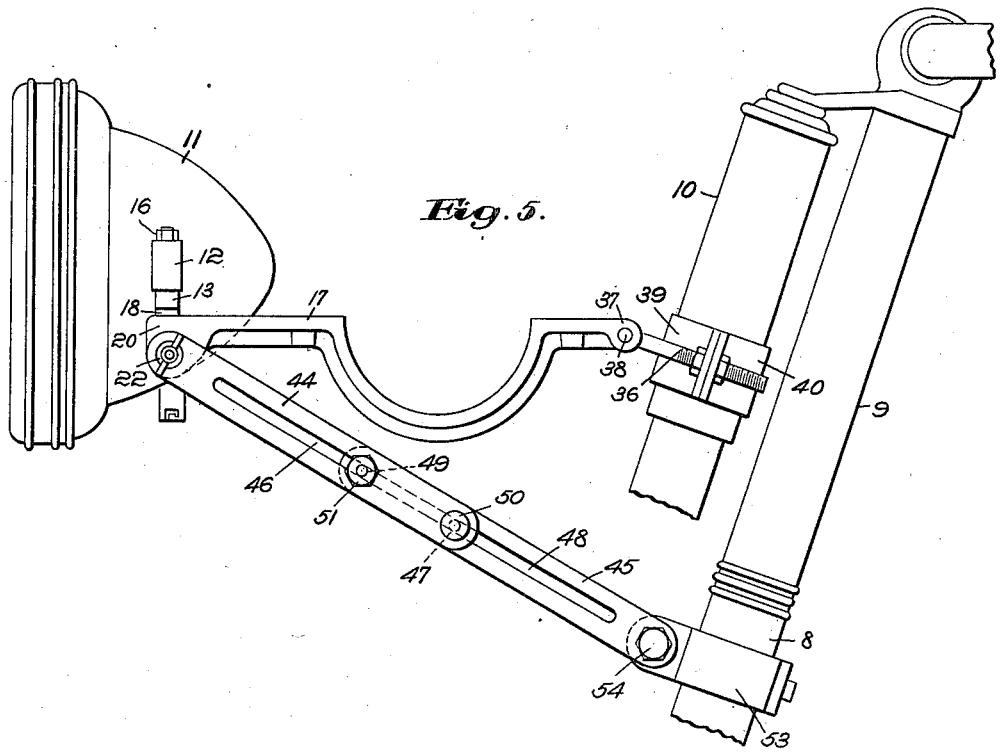
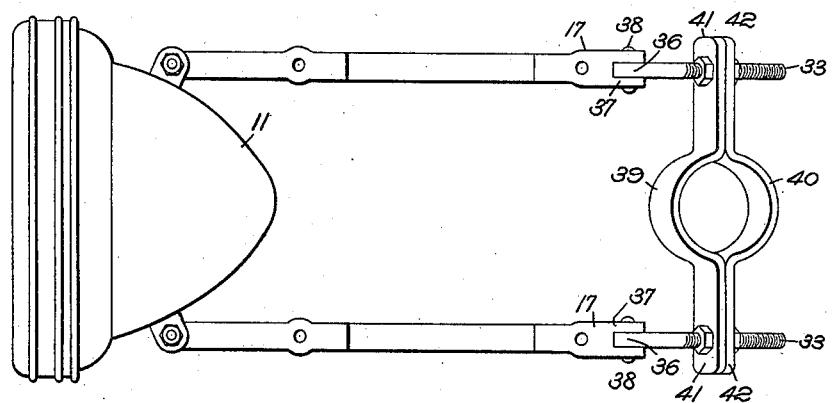

UNITED STATES PATENT OFFICE.

ELLSWORTH A. HAWTHORNE, OF BRIDGEPORT, CONNECTICUT.

LAMP-MOUNTING.

1,090,982. Specification of Letters Patent. Patented Mar. 24, 1914.

Application filed May 10, 1913. Serial No. 766,682.

*To all whom it may concern:*

Be it known that I, ELLSWORTH A. HAWTHORNE, a citizen of the United States, and a resident of Bridgeport, county of Fairfield, and State of Connecticut, have invented an Improvement in Lamp-Mountings, of which the following description, in connection with the accompanying drawings, is a specification, like characters on the drawings representing like parts.

This invention relates to lamp mountings, and more especially to a universally adjustable mounting, or bracket, for supporting a lamp upon the steering structure of a cycle.

My invention will be best understood by reference to the following specification, when taken in connection with the accompanying drawings of two specific embodiments thereof, while its scope will be more particularly pointed out in the appended claims:—

In the drawings: Figure 1 is a side elevation of a lamp mounting embodying my invention, showing in full lines the parts of the mounting in one position of adjustment, and in dotted lines such parts in another position of adjustment; Fig. 2 is a plan of the same; Fig. 3 is a detail sectional view on an enlarged scale on line 3—3 of Fig. 1; Fig. 4 is a detail sectional view on line 4—4 of Fig. 3; Fig. 5 is a side elevation of the mounting, slightly modified to adapt it to a different form of steering structure; and Fig. 6 is a plan of the same.

Referring to the drawings, wherein I have shown two forms of my invention for illustrative purposes, I have disclosed in Figs. 1 and 2 a portion of the steering structure of a motor cycle comprising a pair of members 7—7, which are herein disposed substantially parallel with each other, and are placed obliquely, as is customary with the steering structure of motor cycles.

In Figs. 5 and 6, I have shown a different form of steering structure, comprising a usual fork 8, swiveled in a fixed head 9, in front of which is a common form of spring casing 10 utilized as a part of the fork cushioning means. The two forms of steering structures shown serve to illustrate the different conditions met in practice in providing mountings for lamps upon the steering structure of a motor cycle.

In Figs. 1, 2, 5 and 6, I have shown a lamp 11 of common form, which it is desired to support upon the steering structure of a cycle. This lamp is provided as usual with a pair of lugs 12—12, by means of which the lamp may be supported upon its mountings. Sometimes these lugs are placed vertically upon the lamp, and sometimes horizontally. In the present instance, the lugs are placed vertically, but it will be understood that the mounting is so constructed as to receive equally well lamps having vertically or horizontally disposed lugs. Each of the lugs 12 receives a lamp supporting post 13 of suitable form, the same being herein provided with a reduced portion 14 passing through its lug and having a threaded terminal portion 15, which receives a clamping nut 16, by means of which the lamp lug is secured to its post. The lamp supporting posts 13—13 may be supported on arms 17—17, respectively, in any suitable manner, but herein are pivoted thereon so as to be capable of being adjusted to vary the angular position of the lamp.

Referring more particularly to Figs. 3 and 4, the post 13 is provided with an ear 18, interposed between two ears 19 and 20 on the forward end of the arms 17. A clamping bolt 21 passing through the ears 18, 19 and 20, is provided with a suitable nut, herein a wing-nut 22. If desired, the lamp supporting post may be secured in a fixed position, by simply having its ear 18 clamped between the ears 19 and 20 of the arms 17. Preferably, however, the bolt 21 is provided with a polygonal shank 23, fitting a corresponding perforation 24 in the ear 19, and is further provided with one or more teeth 25, adapted to interlock with suitable indentations 26 in the ear 18. Herein the latter is provided with a perforation of star-shaped outline, with the indentations 26 forming the points of the star. By this means, the lamp supporting post is positively locked, and yet may be angularly adjusted to various predetermined positions of adjustment by simply loosening the nut 22, withdrawing the teeth 25 from the indentations 26 in which they are located, and then swinging the post to the desired angular position, after which the bolt is returned to its interlocking relation with the post, and the nut is screwed up tight to clamp the parts firmly.

Referring to the form shown in Figs. 1 and 2, herein the arms 17 are secured to the members 7 by clamps 27—27, each of which comprises two clamping members 28 and 29, the latter being provided with a tongue 30 passing through and interlocking with a lug 31 on the member 28. The clamping members 28 and 29 are further provided with ears 31 and 32, respectively, through which a threaded member 33 extends. The nuts 34 and 35, threaded on this member, serve to draw the ears 31 and 32 toward each other, thereby to clamp the two clamping members about the support 7. Each of the threaded members 33 is provided with an ear 36, interposed between a pair of ears 37 provided on each arm 17, and is pivoted thereto by means of a bolt 38 passing through said ears. The described attachments thus constitute universal connections between the arms 17 and the supports 7, since the clamps 27 may be angularly adjusted about the axes of the members 7, while the arms 17 may be angularly adjusted about the axes of the bolts 38.

Referring to the form shown in Figs. 5 and 6, instead of employing two pairs of clamps for the attachment of the arms 17, I employ a single pair of clamping members 39 and 40, embracing the spring casing 10 and provided respectively with ears 41—41 and 42—42 to receive the threaded members or eye bolts 33. As a means for holding the arms 17 fixed in the desired angular position, I provide suitable brace means, herein comprising two braces 43, exactly similar to each other in construction. Only one of these braces shows in the drawings, but since they are identical, a detailed description of one will suffice for both. The brace 43 has suitable provision for longitudinal adjustment, so that the lamp mounting may be adjusted to suit various conditions. Such longitudinal adjustment of the brace member may be effected by forming the same in two parts or members 44 and 45. The part 44 is provided with a longitudinal slot 46 and a perforation 47, while the part 45 is similarly provided with a longitudinal slot 48 and a perforation 49. A clamping bolt 50 passes through the perforation 47 and slot 48, while a second clamping bolt 51 passes through the perforations 49 and slot 46. By this means, the two parts of the brace are made adjustable one upon the other lengthwise, but are laterally rigid. The brace 43 may be pivotally attached to the arm 17 in any other suitable manner, but herein is provided with a perforation 52, through which the clamping bolt 21, hereinbefore described, extends, said clamping bolt thus serving as a means of attachment of the brace to the arm, as well as acting to secure the lamp supporting post in fixed position. Herein, the other end of the brace is adjustably secured to the adjacent supporting member 7 by a clamp 53, encircling the latter. This clamp may be, and preferably is, similar in construction to the clamps 27, hereinbefore described, except that it is placed at right angles to the clamp 27, and is provided with a clamping bolt 54 passing through its ears, as well as through the brace 43, thus providing a means whereby the brace may be angularly adjusted about the axis of the member 7, as well as about the axis of the bolt 54. The described attachment, therefore, constitutes a universal connection permitting a varied adjustment of the parts. Referring to Fig. 5, the clamps 53 are similarly arranged, but are attached to the sides of the fork 8, instead of to the supporting members 7.

Referring now to Fig. 1, it will be readily understood that the described lamp mounting is capable of a wide range of adjustment to suit various conditions met in practice. The great latitude of adjustment of which the mounting is capable is illustrated by the full and dotted line positions of the parts in Fig. 1, it being evident that the clamps 27 and 53 may be vertically adjusted, and the threaded member 33 and braces 43 adjusted to correspond with the various positions of adjustment of the clamps. If the arms 17 and braces 43 are placed in the positions shown in dotted lines in Fig. 1, the lamp 11 will be tilted to the position shown in dotted lines in Fig. 1. The adjustable mounting of the lamp supporting posts 13 upon the arms 17, however, permits the lamp to be placed horizontally, if desired, regardless of the angular position of the arms 17, and moreover, the lamp may be angularly adjusted so as to alter the direction of its beam to quite an extent. As before stated, under some circumstances, lamps are provided with horizontal lugs, instead of the vertical lugs shown in the drawings. The mounting is capable of accommodating lamps of such construction, by simply adjusting the lamp supporting posts 13 to a horizontal, or substantially horizontal position. The width of lamps between their lugs often varies greatly, and the spacing of the members 7 of the motor cycle as well as their inclination, often varies greatly. It will be evident, however, that by the use of the described universal connections between the mounting and its support, and between the lamp and the mounting, the latter may be adjusted to a variety of positions within its range of adjustment to suit various conditions met in practice. The lamp mounting may also serve as a convenient support for the lamp supply means, as for example the generator or gas tank in the case of an acetylene gas lamp, or the battery in the case of an electric lamp. The latter type of lamp is shown in the drawings, and I have shown mounted upon the arms 17 a battery box 55 secured to a plate 56 resting upon the arms 17. As a means for adjustably securing the plate to the arms, so as to permit the latter to be adjusted laterally, the plate may be provided with transverse slots 57 to receive clamping screws 58 threaded into the arms 17.

While I have herein shown and described two forms of my invention for illustrative purposes, and have disclosed and discussed in detail the construction and arrangement incidental to two specific applications thereof, it is to be understood that the invention is limited neither to the mere details or relative arrangement of parts, nor to its specific embodiments herein shown, but that extensive deviations from the illustrated forms or embodiments of the invention may be made without departing from the principles thereof.

Having thus described my invention, what I claim and desire by Letters Patent to procure is:—

1. In a mounting of the class described, the combination with a suitable support, of a pair of arms pivoted on said support, and a pair of braces pivoted to said arms and to said support, said braces having provision for longitudinal adjustment.

2. In a mounting of the class described, the combination with a suitable support, of upper and lower clamping means secured to said support, a pair of arms pivoted to said upper clamping means to swing in vertical planes, and a pair of braces pivoted to said arms and to said lower clamping means, each of said braces comprising two longitudinally adjustable members, and means to secure said members to each other in the selected position of adjustment.

3. In a mounting of the class described, the combination with a suitable support, of a pair of arms, means forming universal joints between said arms and said support, a pair of braces to brace said arms, and means forming universal joints between said braces and said support.

4. In a mounting of the class described, the combination with a suitable support, of a pair of arms, means forming universal joints between said arms and said support, a pair of braces to brace said arms, said braces having provision to permit the angular position of said arms to be varied by varying the length of said braces, and means forming universal joints between said braces and said support.

5. In a mounting of the class described, the combination with a suitable support, of a pair of arms pivoted on said support, and a pair of braces pivoted to said arms and to said support, each of said braces comprising two members one of which is provided with a longitudinal slot, and clamping means extending through said slot.

6. In a mounting of the class described, the combination with a suitable support, of a pair of arms pivoted on said support, and a pair of braces pivoted to said arms and to said support, each of said braces comprising two members each of which is provided with a longitudinal slot and a perforation, a clamping bolt extending through the perforation of one member into the slot of the other, and a clamping bolt extending through the perforation of the latter into the slot of the former.

7. In a mounting of the class described, the combination with a suitable support, of a pair of arms pivoted on said support, and a pair of lamp supporting posts pivoted on said arms, respectively, said arms and posts of each pair being arranged to swing in the same or substantially parallel planes.

8. In a mounting of the class described, the combination with a suitable support, of a pair of arms pivoted on said support, means to hold said arms fixed upon their pivots, a pair of lamp supporting posts pivoted on said arms respectively, and means to hold said posts in fixed position, said arms and posts of each pair being arranged to swing in the same or substantially parallel planes.

9. In a mounting of the class described, the combination with a suitable support, of a pair of arms, a pair of braces for said arms, means for adjustably securing said arms and braces to said support, and a pair of lamp-supporting posts pivotally supported on said arms.

10. In a mounting of the class described, the combination with a pair of supports, of a pair of arms, universal joints connecting said arms to said supports, respectively, a pair of braces for said arms, and universal joints connecting said braces to said supports, respectively.

11. A lamp-mounting comprising, in combination, a lamp supporting bracket, a pair of lamp-supporting posts, and pivots on which said posts are respectively pivoted upon said bracket to swing in substantially parallel vertical planes.

12. A lamp-mounting comprising, in combination, a lamp-supporting bracket, a pair of lamp-supporting posts, pivots on which said posts are respectively pivoted on said bracket on a horizontal axis, and means to secure said posts in fixed position with respect to said bracket.

13. The combination with a lamp provided with a pair of lugs, of a pair of posts on which said lugs are supported, a pair of pivots disposed below said lugs respectively and adjacent the sides of said lamp, a bracket on which said posts are mounted on said pivots, and means to secure said posts in fixed position with respect to said bracket.

14. A lamp-mounting comprising, in combination, a lamp-supporting bracket, a pair of lamp-supporting posts pivoted on said bracket to swing in substantially vertical planes about a horizontal axis, and means interengaging with said posts and said brackets to lock said posts in fixed position.

15. A lamp-mounting comprising, in combination, a lamp-supporting bracket, a pair of lamp-supporting posts pivoted on said bracket to swing about a horizontal axis, and a pair of bolts forming pivots for said posts, said bolts being provided with means to secure said posts in fixed position with respect to said bracket.

16. A lamp-mounting comprising, in combination, a lamp-supporting bracket, a pair of lamp-supporting posts pivoted on said bracket to swing about a horizontal axis, and a pair of bolts forming pivots for said posts, said bolts being provided with means interengaging with said posts and said bracket to lock said posts in fixed position.

In testimony whereof, I have signed my name to this specification, in the presence of two subscribing witnesses.

ELLSWORTH A. HAWTHORNE.

Witnesses:
E. HORACE HAWTHORNE,
VERONICA L. KELLEY.

Copies of this patent may be obtained for five cents each, by addressing the "Commissioner of Patents, Washington, D. C."